(12) United States Patent
Kimura

(10) Patent No.: US 9,716,810 B2
(45) Date of Patent: Jul. 25, 2017

(54) IMAGE PROCESSING APPARATUS CONFIGURED TO PERFORM SMOOTHING BASED ON ANALYSIS OF PDL DATA, AND STORAGE MEDIUM STORING PROGRAM THEREFOR

(71) Applicant: CANON KABUSHIKI KAISHA, Tokyo (JP)

(72) Inventor: Hiromi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/960,728

(22) Filed: Dec. 7, 2015

(65) Prior Publication Data
US 2016/0173727 A1    Jun. 16, 2016

(30) Foreign Application Priority Data

Dec. 11, 2014   (JP) ................................. 2014-250712

(51) Int. Cl.
*G06K 15/02* (2006.01)
*H04N 1/409* (2006.01)
(Continued)

(52) U.S. Cl.
CPC ......... *H04N 1/4092* (2013.01); *G06K 15/181* (2013.01); *G06T 11/60* (2013.01); *H04N 1/58* (2013.01)

(58) Field of Classification Search
USPC ...... 358/1.9, 2.1, 2.99, 3.01, 3.06, 3.1, 3.15, 358/3.23, 3.27
See application file for complete search history.

(56) References Cited

U.S. PATENT DOCUMENTS 6,466,335 B1 * 10/2002 Umezawa ................ H04N 1/40
358/1.9
6,903,828 B1 *  6/2005 Kawano ............... G06K 15/005
358/1.11
(Continued)

FOREIGN PATENT DOCUMENTS

JP           05024259 A        2/1993
JP           11331603 A       11/1999
(Continued)

OTHER PUBLICATIONS

Extended European Search Report issued in European Appln. No. 15194995.5 mailed May 6, 2016.
(Continued)

*Primary Examiner* — Marcellus Augustin
(74) *Attorney, Agent, or Firm* — Rossi, Kimms & McDowell LLP

(57) ABSTRACT

An image processing apparatus capable of suppressing the occurrence of a density gap within the same object due to smoothing processing, and a storage medium are provided. An image processing apparatus according to an embodiment of the present invention includes a determination unit configured to determine whether or not a drawing command for an object is a gradation drawing command by analyzing data described in a page description language. Further, the image processing apparatus includes a control unit configured to apply image processing to an edge portion of the object in a case where the determination unit determines that the drawing command for the object is not a gradation drawing command, and to suppress image processing for the edge portion of the object in a case where the determination unit determines that the drawing command for the object is a gradation drawing command.

13 Claims, 11 Drawing Sheets

| ATTRIBUTE | Thin Line | Line | Graphic | Small Text | Text | Image |
|---|---|---|---|---|---|---|
| SMOOTHING CONTROL | OFF | ON | ON | OFF | ON | OFF |

501

(51) Int. Cl.
*G06T 11/60* (2006.01)
*H04N 1/58* (2006.01)

(56) References Cited

U.S. PATENT DOCUMENTS

| | | | |
|---|---|---|---|
| 6,903,844 B1* | 6/2005 | Kamiya | H04N 1/407 358/2.1 |
| 7,443,543 B2 | 10/2008 | Kaburagi | |
| 2010/0265549 A1* | 10/2010 | Kashibuchi | H04N 1/4092 358/3.06 |
| 2011/0116114 A1 | 5/2011 | Nagai | |
| 2012/0147431 A1* | 6/2012 | Kashibuchi | H04N 1/4092 358/3.27 |

FOREIGN PATENT DOCUMENTS

| | | |
|---|---|---|
| JP | 2001063148 A | 3/2001 |
| JP | 2001094773 A | 4/2001 |
| JP | 2005119249 A | 5/2005 |
| JP | 2005129995 A | 5/2005 |
| JP | 2011166765 A | 8/2011 |

OTHER PUBLICATIONS

"Creating Smooth Gradients for PostScript Output." Eureka Printing Company, Inc. Apr. 1, 2001. pp. 1-10. Web. Apr. 26, 2016.
Office Action issued in Japanese Appln. No. 2014-250712, mailed Nov. 29, 2016.
Office Action issued in Japanese Appln. No. 2014-250712 mailed Nov. 29, 2016. English machine translation provided.

* cited by examiner

| ATTRIBUTE | Thin Line | Line | Graphic | Small Text | Text | Image |
|---|---|---|---|---|---|---|
| SMOOTHING CONTROL | OFF | ON | ON | OFF | ON | OFF |

FIG.8A
```
procedure TForm1.FormPaint(Sender: TObject);
begin
  with Canvas do begin
    BeginPath(Handle);
      MoveTo(10,10);
      LineTo(200,50);
      LineTo(150,70);
      LineTo(70,250);
      CloseFigure(Handle);
    EndPath(Handle);
    Brush.Color := RGB(0,0,0);
    Pen.Color := clBlack;
    Pen.Width := 1;
    StrokeAndFillPath(Handle);
    PaintRgn(Handle,RGN);
  end;
end;
```
801
FIG.8B
802
FIG.8C
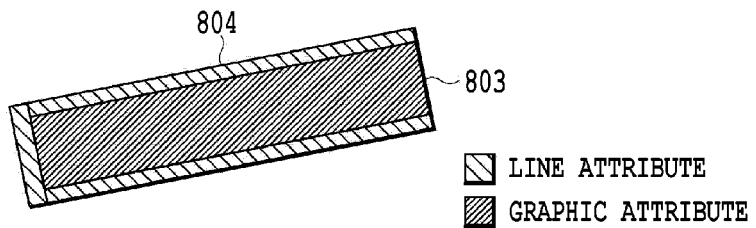
804
803
▨ LINE ATTRIBUTE
▩ GRAPHIC ATTRIBUTE

IMAGE PROCESSING APPARATUS CONFIGURED TO PERFORM SMOOTHING BASED ON ANALYSIS OF PDL DATA, AND STORAGE MEDIUM STORING PROGRAM THEREFOR

BACKGROUND OF THE INVENTION

Field of the Invention

The present invention relates to an image processing apparatus capable of performing smoothing processing on a drawing object that is obtained by analyzing PDL data described in a page description language (PDL), and a storage medium.

Description of the Related Art

Conventionally, a method for reducing jaggies that occur in the drawing processing of a character or graphics by smoothing processing has been proposed. Jaggies refer to ruggedness that occurs at an edge portion of a character or graphics and there is a tendency for jaggies to appear remarkably in a character or graphics for which monochrome drawing at a high density is specified. FIG. 11A shows an example of jaggies resulting from image processing and FIG. 11B shows an example in which jaggies have been reduced by the smoothing processing. As shown in FIG. 11A and FIG. 11B, by performing the smoothing processing, jaggies are reduced and the edge portion becomes smooth.

In the conventional image processing, whether or not to perform smoothing processing is determined according to the kind (attribute) of a drawing object that is obtained by analyzing PDL data. Further, there is a technique to control whether or not to perform smoothing processing based on the results of comparison by detecting an edge portion of a drawing object and comparing the edge portion with an arbitrary parameter (density value or luminance value) for each pixel constituting the edge portion. Furthermore, there is a method for changing whether or not to perform smoothing processing for each density of a pixel based on the above-described technique (see Japanese Patent Laid-Open No. 2005-129995).

However, with the conventional technique, in the case where the image processing is performed on a drawing object in which there is a difference in density value depending on the drawing position within the same drawing object, such as a drawing object shown in FIG. 4A, there is a possibility that the smoothing processing will switch between ON and OFF within the same drawing object. Due to this, there is such a problem that a density gap greater than supposed occurs within the same drawing object as shown in FIG. 4B.

SUMMARY OF THE INVENTION

The present invention has been made in view of such a problem and an object of the present invention is to provide an image processing apparatus capable of suppressing the occurrence of a density gap within the same drawing object due to the smoothing processing, and a storage medium.

An image processing apparatus according to an embodiment of the present invention includes a determination unit configured to determine whether or not a drawing command for an object is a gradation drawing command by analyzing data described in a page description language. Further, the image processing apparatus includes a control unit configured to apply image processing to an edge portion of the object in a case where the determination unit determines that the drawing command for the object is not a gradation drawing command, and to suppress image processing for the edge portion of the object in a case where the determination unit determines that the drawing command for the object is a gradation drawing command.

Further features of the present invention will become apparent from the following description of exemplary embodiments (with reference to the attached drawings).

BRIEF DESCRIPTION OF THE DRAWINGS

FIGS. 8A to 8C are diagrams showing examples of a plurality of drawing commands for drawing a drawing object, a bitmap image that is generated by the plurality of drawing commands, and a bitmap attribute image that is generated by the plurality of drawing commands;

DESCRIPTION OF THE EMBODIMENTS

In the following, embodiments of the present invention are explained with reference to the drawings. Configurations shown below are merely exemplary and the present invention is not limited to the configurations shown schematically. Further, all the features explained in the embodiments shown below are not necessarily indispensable to the present invention.

First Embodiment

Figure 1:
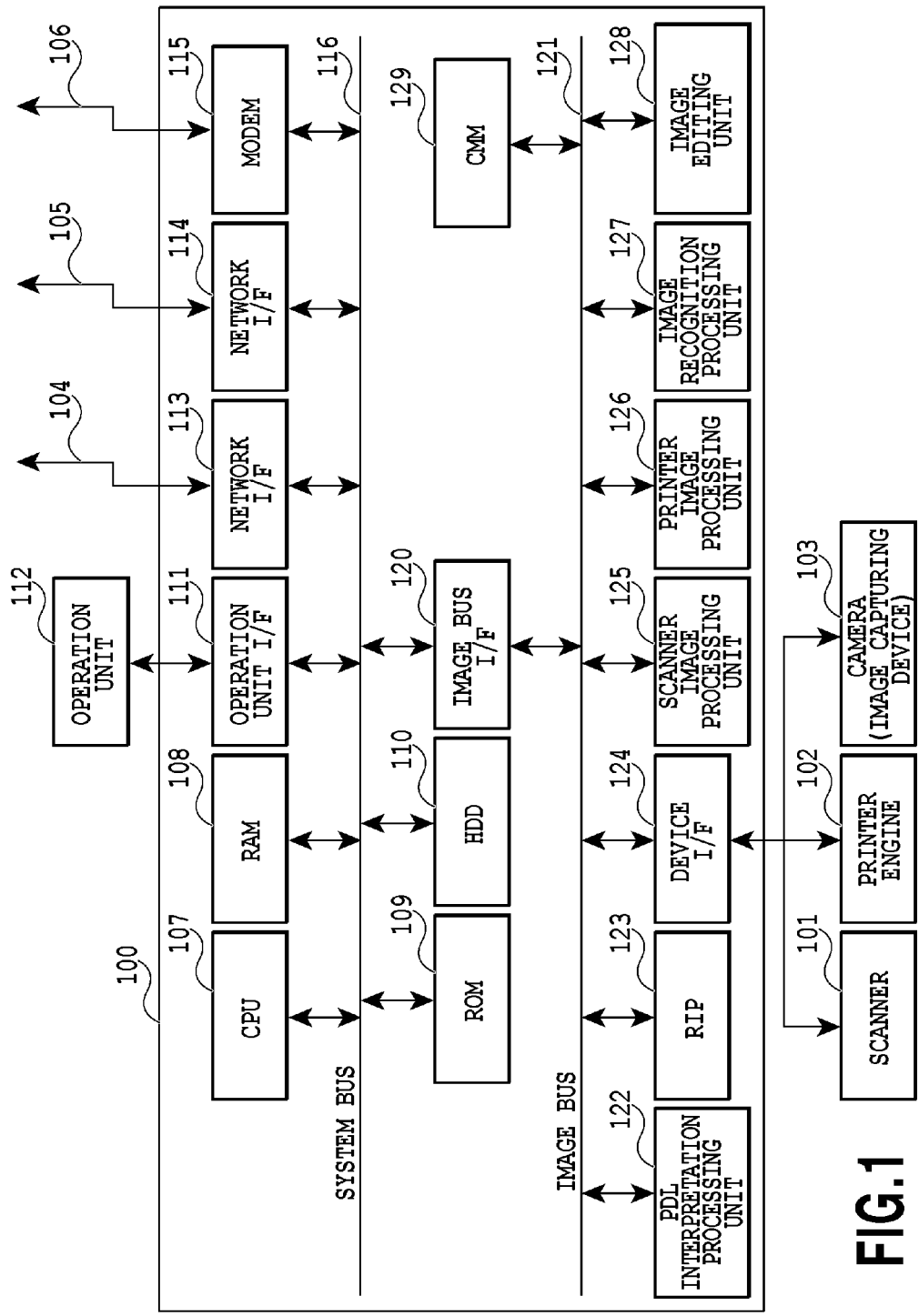
FIG. 1 is a block diagram showing a configuration example of an image processing apparatus according to a first embodiment of the present invention.

FIG. 1 is a block diagram showing a configuration example of an image processing apparatus according to a first embodiment of the present invention.

An image processing apparatus 100 is connected with a scanner 101, which is an image input device, a camera (image capturing device) 103, and a printer engine 102, which is an image output device, via a device I/F 124. The image processing apparatus 100 reads image data from, and outputs a print to equipment connected via the device I/F 124.

A CPU 107 is a central processing unit configured to control the whole of an image forming apparatus. A RAM 108 functions as an image memory for temporarily storing input image data as well as functioning as a work memory of the CPU 107. A ROM 109 is a boot ROM and in which a boot program of the system is stored. A hard disk drive (HDD) 110 stores system software for various kinds of processing, input image data, etc.

An operation unit I/F (interface) 111 is an interface for connecting an operation unit 112 having a display screen, on which image data or the like can be displayed, with a system bus 116. The operation unit I/F 111 outputs operation screen data to the operation unit 112. Further, the operation unit I/F 111 transfers information that is input to the operation unit 112 by an operator to the CPU 107.

Network I/Fs 113 and 114 are connected to networks 104 and 105 via, for example, a network interface card (NIC). The network I/Fs 113 and 114 input and output information from and to an external device via the networks 104 and 105. In FIG. 1, the two network I/Fs 113 and 114 are shown, but the image processing apparatus 100 may include one or three or more network I/Fs. A modem 115 is connected to a public circuit 106 and inputs and outputs information from and to an external device via the public circuit 106.

The units described above are arranged on the system bus 116.

An image bus I/F 120 is an interface for connecting the system bus 116 with an image bus 121 for transferring image data at high speed, and is a bus bridge that converts a data structure. To the image bus 121, a PDL interpretation processing unit 122, a raster image processor (RIP) 123, a device I/F 124, and a scanner image processing unit 125 are connected. Further, to the image bus 121, a printer image processing unit 126, an image recognition processing unit 127, an image editing image processing unit 128, and a color management module (CMM) 129 are connected.

The PDL interpretation processing unit 122 interprets page description language (PDL) data, assigns an attribute to a drawing object, and generates intermediate data (display list).

The RIP 123 develops page description language (PDL) data or vector data into an image and generates bitmap image data.

The device I/F 124 is an interface for connecting the scanner 101, the printer engine 102, and the camera 103 with the image bus 121.

The scanner image processing unit 125 performs various kinds of processing, such as correcting, processing, and editing, on image data that is input from the scanner 101.

The printer image processing unit 126 performs image processing, such as image correcting and resolution converting, in accordance with the characteristics of the drawing object and the printer engine 102 on image data that is printed and output.

The image recognition processing unit 127 determines whether or not the image data that is input from the camera 103 is a recognition code, such as a two-dimensional code, and analyzes encoded information included in the recognition code.

The image editing image processing unit 128 performs various kinds of image processing, such as processing to rotate the image data and processing to compress/decompress the image data.

The CMM 129 is a dedicated hardware module that performs color conversion processing (also referred to as color space conversion processing) based on a profile or calibration data on the image data. The profile is information including a function for converting color image data represented in a device-dependent color space into color image data represented in a device-independent color space (e.g., Lab color space). The calibration data is data used to modify color reproduction characteristics of the scanner 101 and the printer engine 102.

Figure 2:
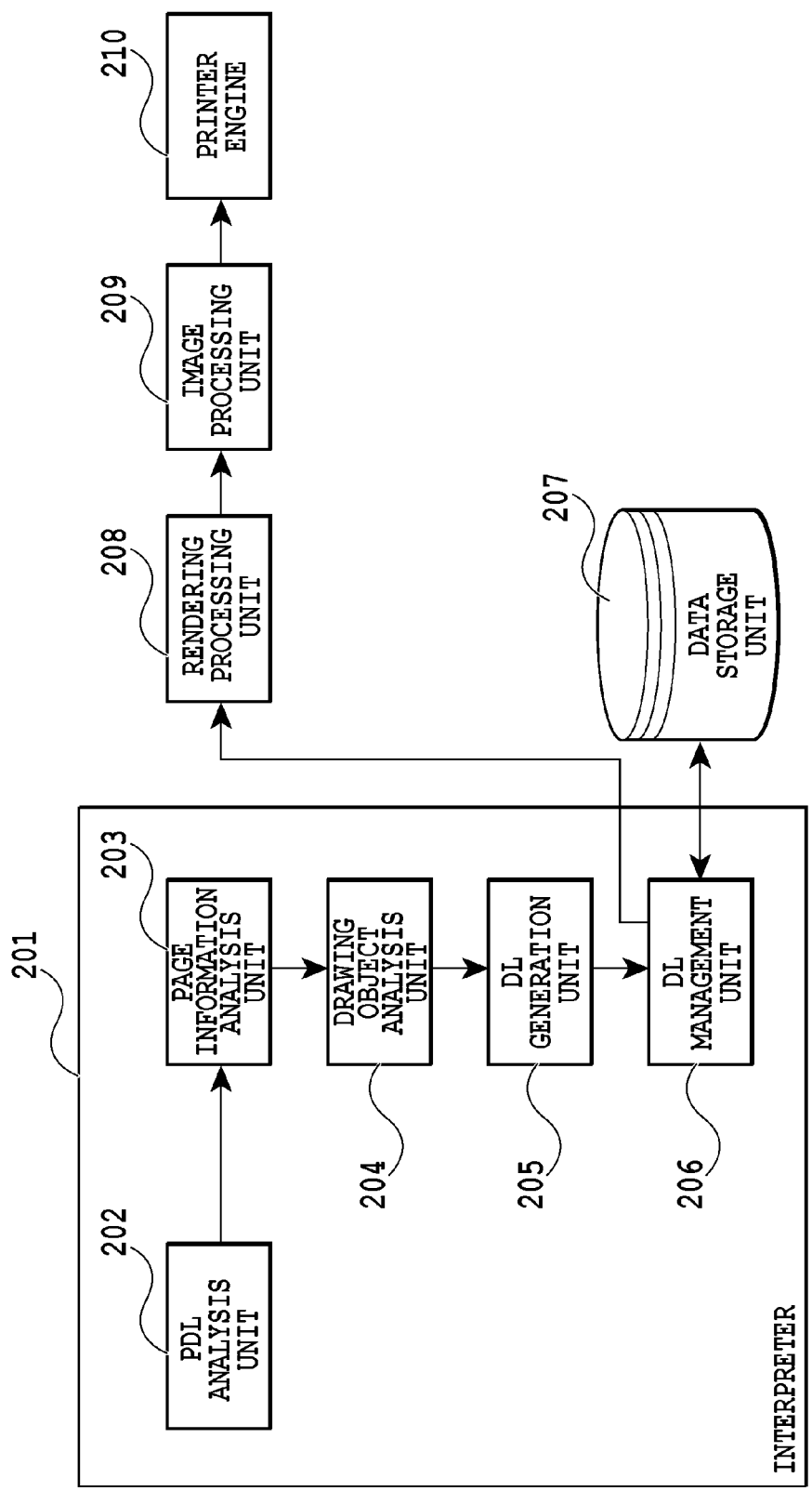
FIG. 2 is a block diagram showing a configuration example of a PDL interpretation processing unit according to the first embodiment of the present invention.

FIG. 2 is a block diagram showing a configuration example of the PDL interpretation processing unit 122 according to the first embodiment of the present invention.

An interpreter 201 constituting the PDL interpretation processing unit 122 includes a PDL analysis unit 202 configured to analyze the language of PDL data and a page information analysis unit 203 configured to analyze page information included in PDL data. Further, the interpreter 201 includes a drawing object analysis unit 204 configured to analyze a drawing object included in PDL data and a display list (DL) generation unit 205 configured to generate intermediate data called a display list from a drawing object. Furthermore, the interpreter 201 includes a DL management unit 206. The DL management unit 206 caches information on a drawing object and font. The DL management unit 206 stores a display list in a data storage unit 207, which is a temporary storage device, such as a memory and an HDD. It is possible to read and reuse a display list stored in the data storage unit 207.

The PDL analysis unit 202 analyzes various kinds of input PDL data. The format of PDL data includes the PostScript (registered trademark) language of Adobe Systems Incorporated, the PCL (Printer Control Language) (registered trademark) of HP (Hewlett-Packard) Company, etc. It is also possible for the PDL analysis unit 202 to analyze the PDF (registered trademark), which is the document format of Adobe Systems Incorporated. Further, it is also possible for the PDL analysis unit 202 to perform processing on the format for the VDP (Variable Data Printing), such as the PPML (Personalized Print Markup Language) and the PDF/VT, in addition to the above. Furthermore, it is also possible for the PDL analysis unit 202 to perform processing on the image compression format, such as JPEG (Joint Photographic Experts Group) and TIFF (Tagged Image File Format).

It is possible for the drawing object analysis unit 204 to function as a drawing command determination unit configured to determine the kind (attribute) of a drawing object or determine whether a specific drawing command (e.g., gradation drawing command) is included by analyzing a plurality of drawing commands for drawing the drawing object. Further, it is also possible for the drawing object analysis unit 204 to determine a detailed setting specified in the drawing command. The contents of the detailed setting will be described later. Further, it is also possible for the drawing object analysis unit 204 to function as an attribute change unit configured to change the attribute of a drawing object in accordance with the results of the determination of the drawing command determination unit. Furthermore, it is also possible for the drawing object analysis unit 204 to function as an attribute assignment unit configured to assign an attribute to the drawing object based on a plurality of drawing commands for drawing the drawing object, or in accordance with the changed attribute. The attribute assignment unit assigns an attribute to the drawing object by, for example, generating attribute data indicating the attribute of each pixel of bitmap image data.

A rendering processing unit 208 includes the CMM (the CMM 129 shown in FIG. 1) configured to perform color matching for the display list and the DL rendering unit (the RIP 123 shown in FIG. 1) configured to perform rendering of the display list into the bitmap image (raster image) data. The rendering processing unit 208 interprets the PDL describing information on each object, such as a character, a line drawing, and graphics, and performs rendering. The bitmap image data generated by the rendering is stored on the memory (not shown).

An image processing unit 209 (the printer image processing unit 126 shown in FIG. 1) performs correction processing and resolution conversion processing in accordance with the features of an input image and the characteristics of the printer engine on the bitmap image data generated by the rendering processing unit 208.

A printer engine 210 (the printer engine 102 shown in FIG. 1) performs printing processing on the bitmap image data on which the image processing has been performed by the image processing unit 209.

Figure 3:
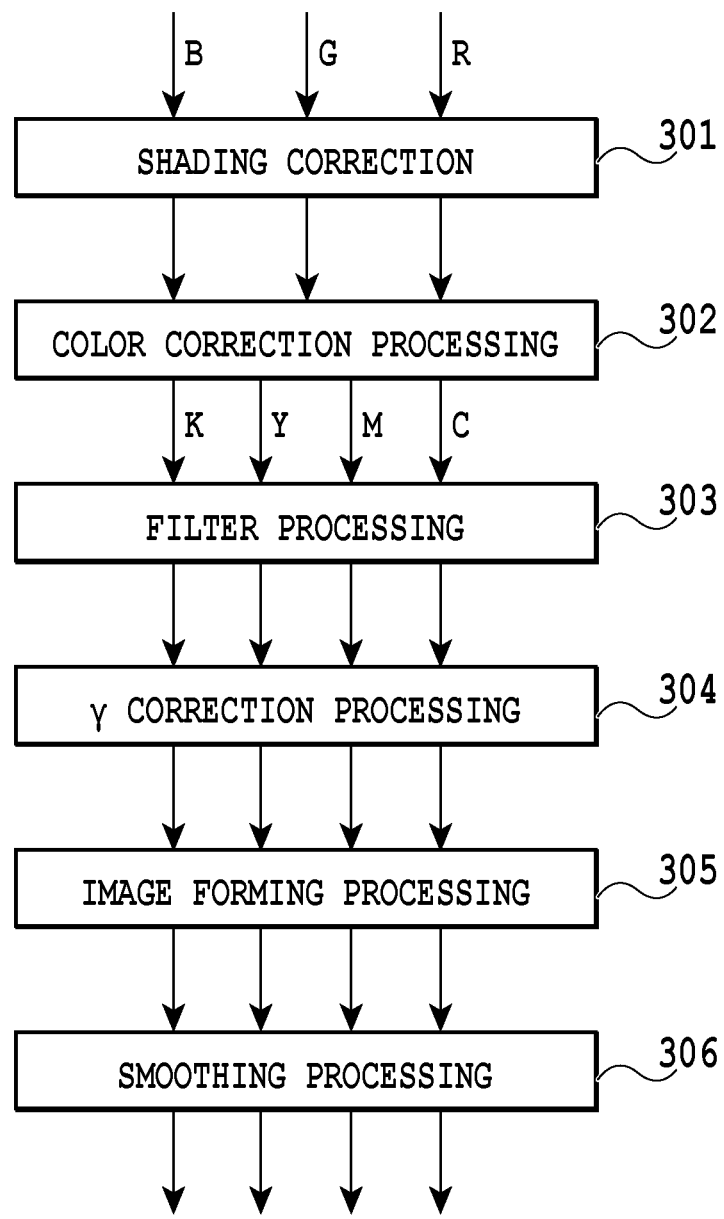
FIG. 3 is a diagram showing image processing by an image processing unit according to the first embodiment of the present invention.

FIG. 3 is a diagram showing the image processing that is performed by the image processing unit (the printer image processing unit 126 shown in FIG. 1 and the image processing unit 209 shown in FIG. 2) according to the first embodiment of the present invention.

The printer image processing unit 126 shown in FIG. 1 performs shading correction 301, color correction processing 302, a filter processing 303, γ correction processing 304, image forming processing 305, and smoothing processing 306 on the bitmap image data generated by the RIP 123 shown in FIG. 1.

After performing the image processing, the printer image processing unit 126 outputs the bitmap image data to the printer engine 102 via the device I/F 124 shown in FIG. 1. In the image forming processing 305 of the present embodiment, N-bit bitmap image data that is input is converted into M-bit bitmap image data. This conversion processing is publicly known, and therefore, detailed explanation is omitted. In this conversion processing, for example, the screen (dither) processing or the error diffusion processing is used.

Next, the processing of the control program to determine whether or not to perform smoothing processing on each drawing object by analyzing PDL data is explained.

Figure 4A:
FIGS. 4A to 4C are diagrams showing an example of a drawing object in which the density value (or luminance value) varies within the drawing object and examples of the results of the drawings generated from the drawing object.
Figure 4B:
Figure 4C:

FIGS. 4A to 4C are diagrams showing an example of a drawing object in which the density value (or luminance value) varies within the drawing object and examples of the results of the drawings generated from the drawing object. More specifically, FIG. 4A shows an example of a drawing object and FIGS. 4B and 4C show the results of the drawings generated from the drawing object.

In the drawing object shown in FIG. 4A, there is a difference in density value depending on the drawing position within the same drawing object. Because of this, in the case where image correction processing is performed on the drawing object shown in FIG. 4A, the smoothing processing switches between ON and OFF within the same drawing object and a density gap occurs within the same drawing object as shown in FIG. 4B. In the present embodiment, whether or not there is a possibility that the smoothing processing will switch between ON and OFF within the same drawing object is determined, and in the case where there is such a possibility of switching, the smoothing processing is prevented from being performed on the drawing object. As a result of this, in the present embodiment, it is possible to obtain the results of the drawing in which the density gap is suppressed as shown in FIG. 4C.

Figure 5:
FIG. 5 is a diagram showing an example of a table indicating a correspondence between the attribute that is assigned to a drawing object and whether or not to perform smoothing processing according to the first embodiment of the present invention.

FIG. 5 shows an example of an attribute information management table indicating a correspondence between the attribute of a drawing object and whether or not to perform smoothing processing. The attribute information management table is stored in advance in the memory, such as the RAM 108 and the ROM 109.

In an attribute information management table 501, in the case where the attribute of a drawing object is Text, Graphic, or Line, it is specified that the smoothing processing is performed (ON) at the time of drawing the drawing object. On the other hand, in the case where the attribute of the drawing object is Image, Thin Line, or Small Text, it is specified that the smoothing processing is not performed (OFF) at the time of drawing the drawing object.

Figure 6:
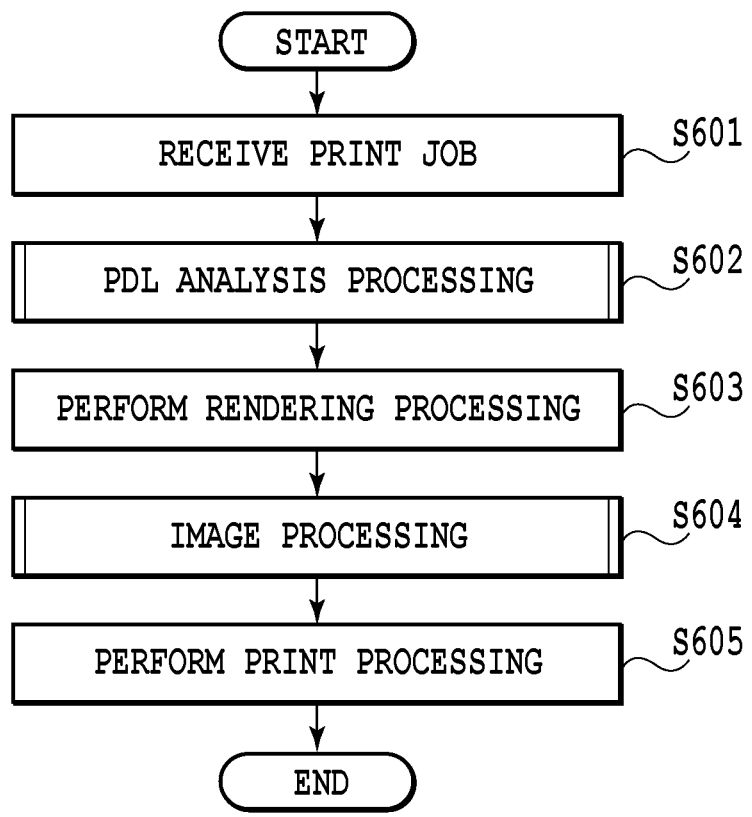
FIG. 6 is a flowchart showing processing of the image processing apparatus according to the first embodiment of the present invention.

FIG. 6 is a flowchart showing the processing of the image processing apparatus according to the first embodiment of the present invention.

At step S601, the image processing apparatus receives a print job including PDL data from a host computer (not shown) connected via the network I/Fs 113 and 114 shown in FIG. 1.

Next, at step S602, the image processing apparatus analyzes PDL data, assigns an attribute to the drawing object, and generates a display list, which is intermediate data. This processing is performed by the PDL analysis unit 202, the page information analysis unit 203, the drawing object analysis unit 204, and the PDL generation unit 205 shown in FIG. 2.

Next, at step S603, the rendering processing unit 208 shown in FIG. 2 generates bitmap image data (multivalued data) by performing rendering processing on the display list.

Next, at step S604, the image processing unit 209 shown in FIG. 2 performs image processing on bitmap image data and outputs the bitmap image data to the printer engine.

Next, at step S605, the printer engine 210 shown in FIG. 2 performs printing processing. Then, the image processing apparatus terminates the processing.

Figure 7:
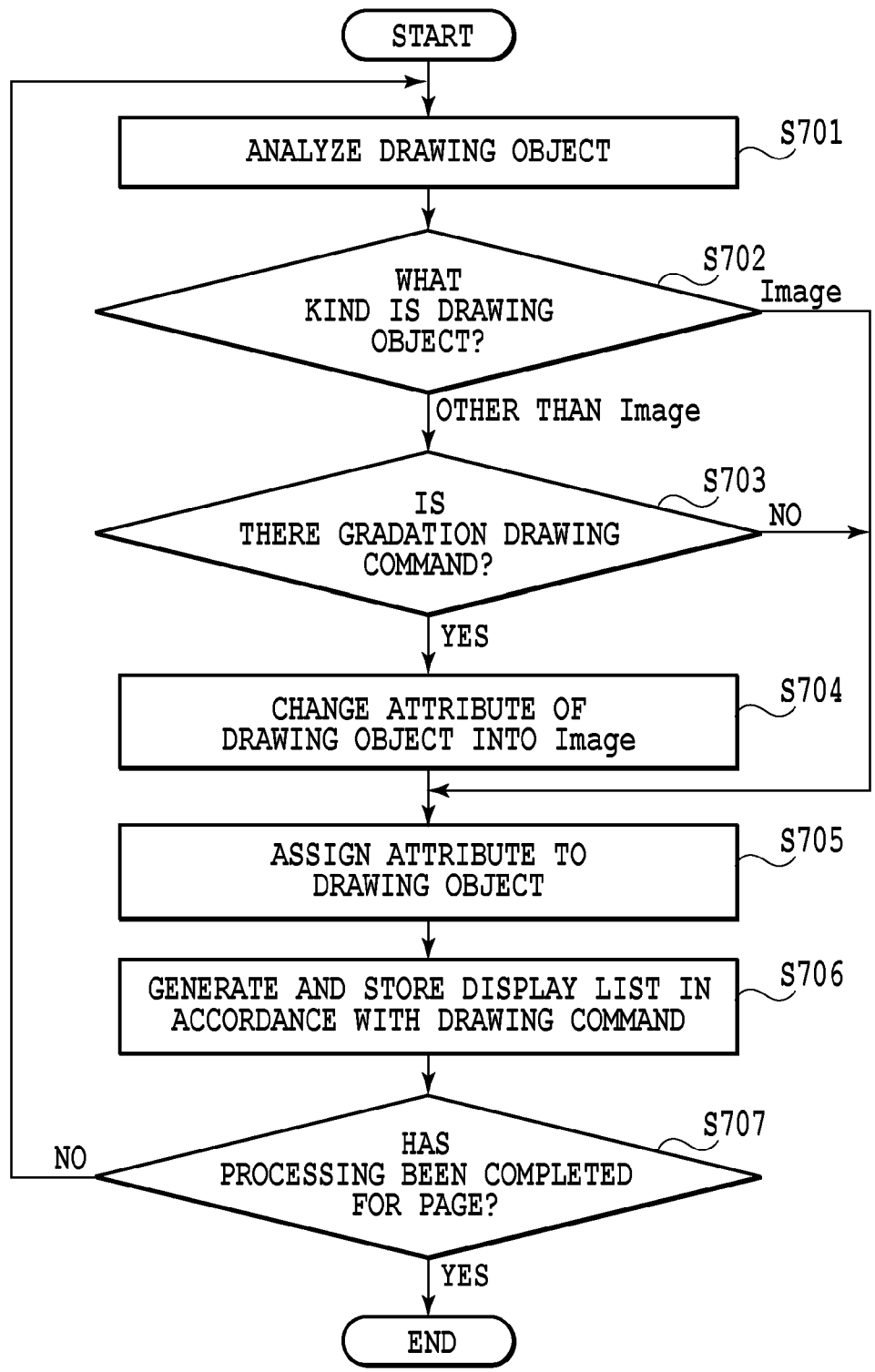
FIG. 7 is a flowchart of PDL analysis processing according to the first embodiment of the present invention.

Here, the PDL analysis processing at step S602 in FIG. 6 described above is explained in more detail. FIG. 7 shows a flowchart of the PDL analysis processing according to the first embodiment of the present invention.

At step S701, the image processing apparatus analyzes the drawing command group including a plurality of drawing commands for drawing the drawing object for the drawing object included in the PDL data. By this analysis processing, the image processing apparatus obtains information on drawing commands of a character, graphics, a line, etc., constituting the drawing object. In the case where the drawing object has a line drawing command, the image processing apparatus obtains information indicating whether the line drawing command has modification information indicating the shape of the tip, whether the line drawing command has information on instructions to paint the image, etc. Next, with reference to FIGS. 8A to 8C, a plurality of drawing commands for drawing a drawing object is explained.

FIGS. 8A to 8C show examples of a plurality of drawing commands for drawing a drawing object, a bitmap image that is generated by the plurality of drawing commands, and a bitmap attribute image data that is generated by the plurality of drawing commands. A plurality of drawing commands 801 shown in FIG. 8A is described in the PDL and includes drawing commands for specifying a canvas on which an image is drawn, coordinates of the positions of the starting point and each sequence of points, color values, a stroke width, etc. The image processing apparatus sequentially analyzes the plurality of drawing commands for each drawing command group including such a plurality of drawing commands.

By the image processing apparatus interpreting the plurality of drawing commands 801 and drawing an image, a bitmap image as shown in FIG. 8B is generated. Further, based on the kind of the drawing command, a bitmap attribute image as shown in FIG. 8C is also generated.

A drawing command to paint an object, such as "Brush. Color:=RGB (0, 0, 0);" shown in FIG. 8A, assigns a graphic attribute to the object. An object 803 shown in FIG. 8C. is an example to which a graphic attribute is assigned. On a pixel assigned the graphic attribute, image processing is performed in the state where optimum image processing parameters (adjustment of amount of toner, halftone kind selection, etc.) for the graphic data are selected.

On the other hand, a drawing command to stroke, such as "Pen. Width:=1;" and "StrokeAndFillPatch (Handle);" shown in FIG. 8A, assigns a line attribute to the object. An object 804 shown in FIG. 8C is an example to which a line attribute is assigned. On a pixel assigned the line attribute, image processing is performed in the state where optimum image processing parameters (smoothing, adjustment of amount of toner, etc.) for the line are selected.

Next, at step S702, the image processing apparatus determines the kind (attribute) of the drawing object. For example, the image processing apparatus determines whether the plurality of drawing commands for drawing the drawing object includes a drawing command to draw Image (natural image). In the case where the attribute of the drawing object is Image, the gradation drawing command is not included in the plurality of drawing commands and the smoothing processing is not performed in the subsequent image processing, and therefore, the image processing apparatus proceeds to step S705. On the other hand, in the case where the attribute of the drawing object is not Image, there is a possibility that the smoothing processing will be performed, and therefore, the image processing apparatus proceeds to step S703.

At step S703, the image processing apparatus determines whether the plurality of drawing commands for drawing the drawing object includes the gradation drawing command. In the case where the gradation drawing command is not included, the smoothing processing is not performed, and therefore, the image processing apparatus proceeds to step S705. On the other hand, in the case where the gradation drawing command is included, there is a possibility that the smoothing processing will be performed and the smoothing processing will switch between ON and OFF within the same drawing object, and therefore, the image processing apparatus proceeds to step S704.

At step S704, the image processing apparatus changes the attribute of the drawing object into an attribute for which the smoothing processing is not performed. It is possible for the image processing apparatus to determine the attribute after the change to be Image, Small Text indicating a lower-case character having a size equal to or less than an arbitrary size, Thin Line indicating a thin line having a size equal to or less than an arbitrary size, etc., by using, for example, the attribute information management table shown in FIG. 5.

Next, at step S705, the image processing apparatus assigns an attribute to the drawing object. To the drawing object whose attribute has been changed at step S704, the changed attribute is assigned. The image processing apparatus assigns the attribute to the drawing object by generating attribute data indicating the attribute of each pixel of the bitmap image data.

Next, at step S706, the image processing apparatus generates and stores a display list in accordance with the drawing commands of the drawing object.

Next, at step S707, the image processing apparatus checks whether or not the processing has been performed on all the drawing objects included in the page. In the case where the processing has been completed for all the drawing objects, the image processing apparatus terminates the processing. In the case where there is a drawing object on which the processing has not been performed yet, the image processing apparatus returns to step S701 and repeats the processing.

As described above, in the PDL analysis processing according to the present embodiment, first, whether or not there is a possibility that the smoothing processing will be performed on the drawing object is determined by determining the kind (attribute) of the drawing object. Next, for the drawing object for which there is a possibility that the smoothing processing will be performed, whether or not there is a possibility that the smoothing processing will switch between ON and OFF within the same drawing object is determined by analyzing the drawing commands for drawing the drawing object. Then, in the case where there is a possibility that the smoothing processing will switch between ON and OFF, the image processing apparatus changes the attribute of the drawing object and assigns the changed attribute to the drawing object so that the smoothing processing is not performed in the subsequent image processing.

Figure 9:
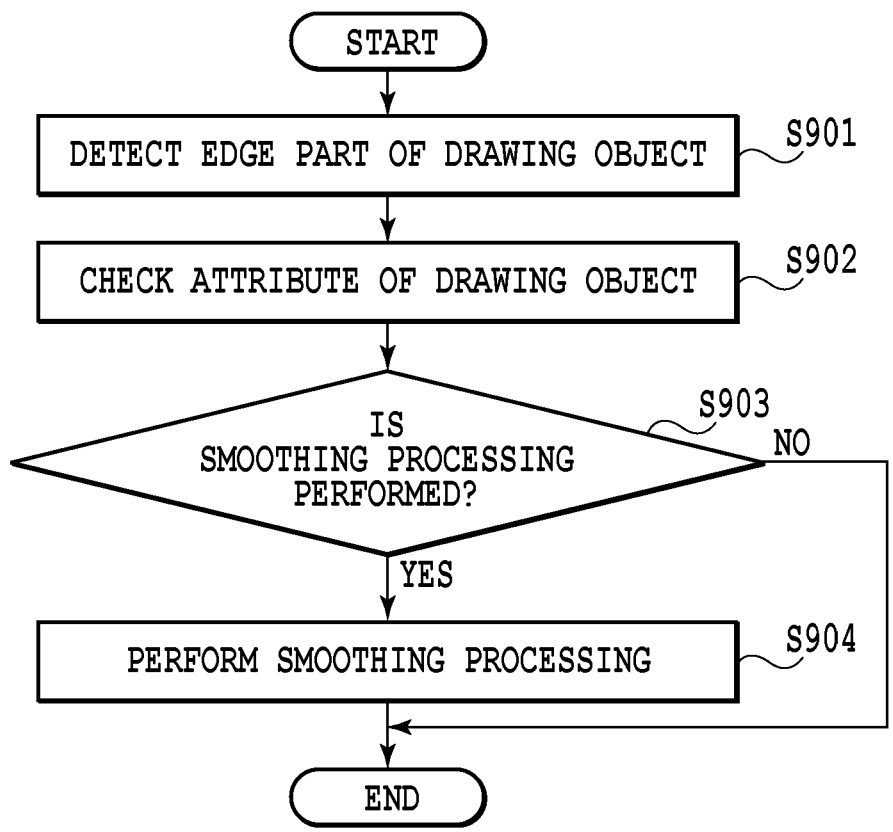
FIG. 9 is a flowchart of the image processing according to the first embodiment of the present invention.

Here, the image processing at step S604 in FIG. 6 described above is explained in more detail. FIG. 9 shows a flowchart of the image processing according to the first embodiment of the present invention. In the present image processing, image data to be output to the printer engine is generated by performing image processing on the bitmap image data generated by the rendering processing unit. In the following explanation, in particular, the smoothing processing 306 shown in FIG. 3 is explained.

At step S901, the image processing apparatus generates pseudo halftone data by performing halftone processing on the bitmap image data. The image processing apparatus detects an edge portion of the drawing object from the bitmap image data and the generated pseudo halftone data.

Next, at step S902, the image processing apparatus checks the attribute assigned to the drawing object and determines whether or not to perform the smoothing processing based on the attribute and the density information on the pixel of interest. For example, in the case where the attribute of the drawing object is Image, the image processing apparatus determines not to perform the smoothing processing. In the case of determining to perform the smoothing processing at step 903, the image processing apparatus proceeds to step S904.

At step S904, the image processing apparatus performs the smoothing processing on the edge portion of the drawing object. On the other hand, in the case of determining not to perform the smoothing processing at step S903, the image processing apparatus terminates the processing.

The method for detecting an edge portion and the processing to determine whether or not to perform the smoothing processing from density information are well-known techniques as disclosed, for example, in Japanese Patent Laid-Open No. 2005-129995, and therefore, detailed explanation is omitted.

As explained above, in the present embodiment, whether or not there is a possibility that the smoothing processing will be performed on the drawing object is determined in the PDL analysis processing. In the case where there is a possibility that the smoothing processing will be performed and that the smoothing processing will switch between ON and OFF within the same drawing object, the attribute of the drawing object is changed so that the smoothing processing is not performed. Due to this, it is made possible to suppress the switching of the smoothing processing between ON and OFF within the same drawing object, and to suppress the density gap that occurs at the edge portion. An example of the drawing object in which the density gap that occurs at the edge portion is suppressed is shown in FIG. 4C.

Second Embodiment

Subsequently, a second embodiment of the present invention is explained.

In the first embodiment described above, whether or not the smoothing processing is performed on the drawing object is determined by determining whether the plurality of drawing commands for drawing the drawing object includes the gradation drawing command. In the present embodiment, in the case where the gradation drawing command is included, whether or not the smoothing processing switches between ON and OFF within the same drawing object is further determined in accordance with the detailed setting specified in the gradation drawing command.

Figure 10:
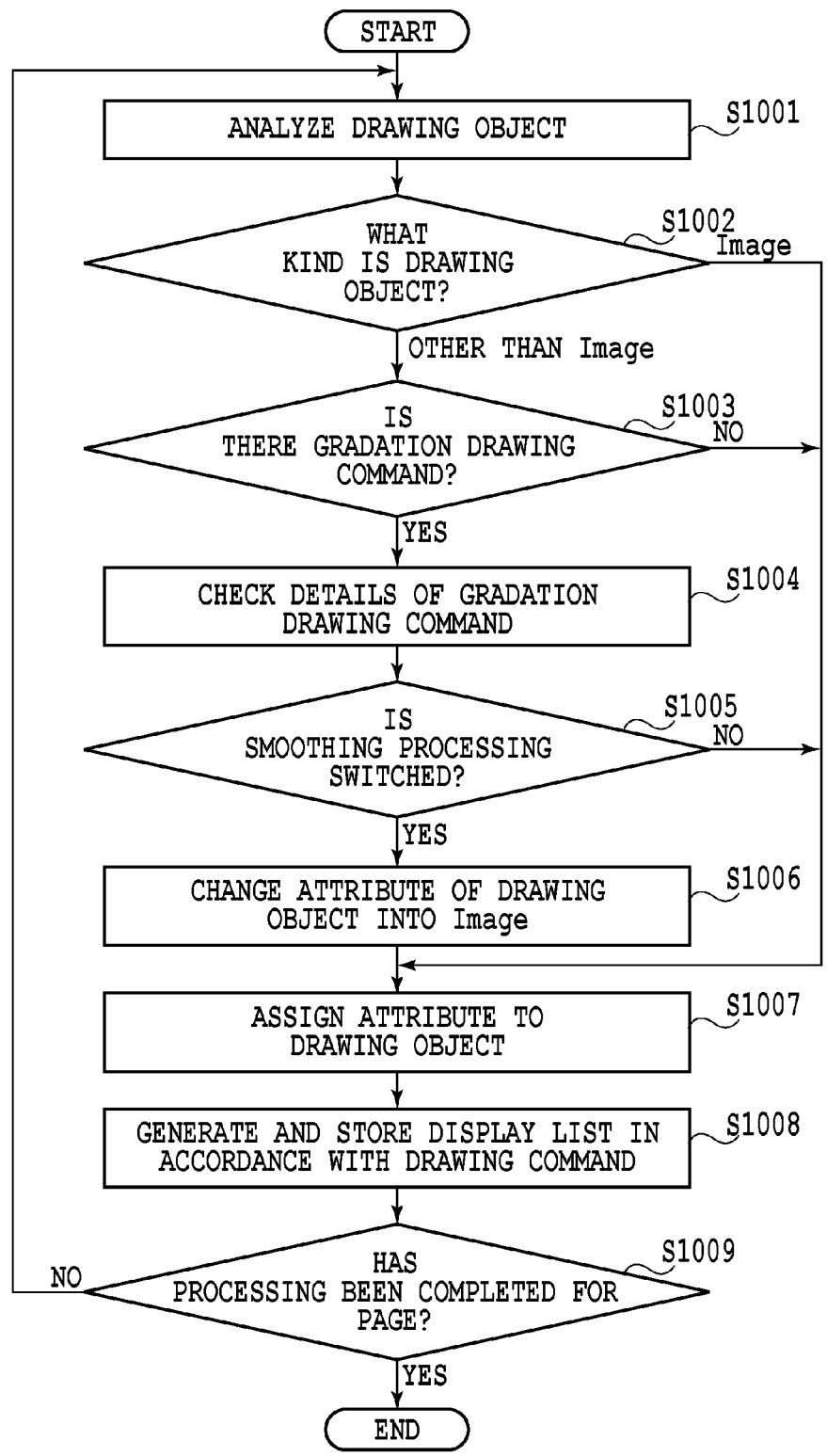
FIG. 10 is a flowchart of PDL analysis processing according to a second embodiment of the present invention.
Figure 11A:
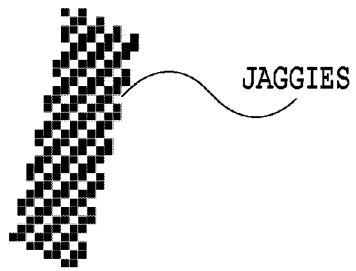
FIGS. 11A and 11B are diagrams showing examples of jaggies.
Figure 11B:
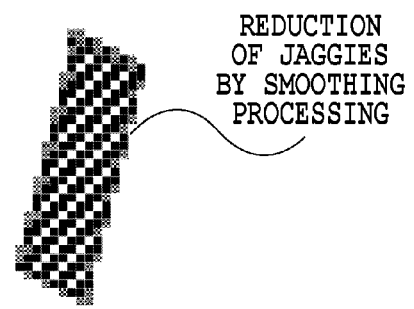

FIG. 10 shows a flowchart of PDL analysis processing according to the second embodiment. The processing at step S1001 to step S1003 and at step S1006 to step S1009 is the same as the processing at step S701 to step S703 and at step S704 to step S707 in FIG. 7, respectively, and therefore, explanation is omitted.

In the PDL analysis processing in the present embodiment, in the case where it is determined that the plurality of drawing commands for drawing the drawing object includes the gradation drawing command at step S1003, the image processing apparatus proceeds to step S1004.

At step S1004, the image processing apparatus checks the detailed setting specified in the gradation drawing command.

Next, at step S1005, the image processing apparatus determines whether or not there is a possibility that the smoothing processing will switch between ON and OFF within the same drawing object based on the detailed setting specified in the gradation drawing command.

Specifically, in the case where the gradation type specified in the gradation drawing command is linear or radial shading, the image processing apparatus determines that there is a possibility that the smoothing processing will switch between ON and OFF within the same drawing object. Alternatively, in the case where the color processing setting (color space specifying) specified in the gradation drawing command is set to DeviceGray, the image processing apparatus determines that there is a possibility that the smoothing processing will switch between ON and OFF within the same drawing object. Alternatively, in the case where the color specified in the gradation drawing command is monochrome, the image processing apparatus determines that there is a possibility that the smoothing processing will switch between ON and OFF within the same drawing object. Alternatively, in the case of determining that the drawing object is drawn in monochrome based on the color space specifying and the color value specifying specified in the gradation drawing command, the image processing apparatus determines that there is a possibility that the smoothing processing will switch between ON and OFF within the same drawing object.

In the case where it is determined that there is a possibility that the smoothing processing will switch between ON and OFF, the image processing apparatus proceeds to step S1006 and changes the attribute of the drawing object into an attribute for which the smoothing processing is not performed.

As explained above, in the present embodiment, whether or not there is a possibility that the smoothing processing will switch between ON and OFF within the same drawing object based on the detailed setting of the gradation drawing command for drawing the drawing object.

As above, the various embodiments of the present invention have been described in detail, but the gist and the scope of the present invention are not limited to the specific explanation and the drawings of the present invention and a person skilled in the art will understand that the gist and the scope of the present invention encompass various modifications and alterations of the contents described in the claims of the present application.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to suppress the occurrence of the density gap within the same drawing object due to the smoothing processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-250712, filed Dec. 11, 2014, which is hereby incorporated by reference wherein in its entirety.

What is claimed is:

1. An image processing apparatus comprising:
a memory configured to store instructions; and
one or more processors configured to execute the instructions to function as:
   a determination unit configured to determine whether or not a drawing command for an object is a gradation drawing command by analyzing data described in a page description language (PDL); and
   a control unit configured to apply smoothing processing to an edge portion of the object whose attribute is a line, graphic, or text attribute, in a case where the object is not drawn by the gradation drawing command, based on the determination by the determination unit, and to suppress smoothing processing for the edge portion of the object whose attribute is a line, graphic, or text attribute, in a case where the object is drawn by the gradation drawing command, based on the determination by the determination unit,
      wherein the attribute of the object is obtained by analyzing the data described in the page description language (PDL), and
      wherein the control unit is further configured to suppress the smoothing processing for the edge portion of the object whose attribute is a line, graphic, or text attribute, and which is drawn by the gradation drawing command, by changing the attribute of the object into an image attribute.

2. The image processing apparatus according to claim 1, wherein
   the determination unit is further configured to sequentially analyze a plurality of drawing commands for drawing the object and perform the determination only in a case where the plurality of drawing commands for drawing the object does not include a drawing command to draw the object whose attribute is Image.

3. The image processing apparatus according to claim 1, wherein the smoothing processing is not performed for the object whose attribute is Image, Thin Line, or Small Text.

4. The image processing apparatus according to claim 1, wherein the processor is further configured to execute instructions to function as an attribute change unit configured to change the attribute by determining a detailed setting specified in the gradation drawing command.

5. The image processing apparatus according to claim 4, wherein the detailed setting specified in the gradation drawing command includes a gradation type, and
   wherein the attribute change unit is configured to change the attribute in a case where the gradation type specified in the gradation drawing command is linear or radial shading.

6. The image processing apparatus according to claim 4, wherein the detailed setting specified in the gradation drawing command includes a color space, and
   wherein the attribute change unit is configured to change the attribute in a case where the color space specified in the gradation drawing command is DeviceGray.

7. The image processing apparatus according to claim 4, wherein the detailed setting specified in the gradation drawing command includes a color, and
   wherein the attribute change unit is configured to change the attribute in a case where the color specified in the gradation drawing command is monochrome.

8. The image processing apparatus according to claim 4, wherein the detailed setting specified in the gradation drawing command includes a color space and a color value, and
   wherein the attribute change unit is configured to change the attribute in a case where it is determined that the object is drawn in monochrome based on the color space and the color value specified in the gradation drawing command.

9. The image processing apparatus according to claim 1, wherein
   the processor is further configured to execute instructions to function as an attribute assignment unit configured to assign the attribute of the object whose attribute has not been changed by the attribute change unit based on the plurality of drawing commands for drawing the object.

10. The image processing apparatus according to claim 9, wherein the processor is further configured to execute instructions to function as:
    a generation unit configured to generate bitmap image data from the PDL data; and
    a smoothing processing determination unit configured to determine whether or not to perform smoothing processing on each drawing object included in the bitmap image data based on the attribute assigned by the attribute assignment unit.

11. The image processing apparatus according to claim 10, wherein
    the attribute assignment unit is configured to perform the assignment by generating attribute data indicating the attribute of each pixel of the bitmap image data.

12. A method of controlling an image processing apparatus configured to perform image processing, the method comprising:
    determining whether or not a drawing command for an object is a gradation drawing command by analyzing data described in a page description language (PDL);
    in a case where the object is not drawn by the gradation drawing command, applying smoothing processing to an edge portion of the object whose attribute is a line, graphic, or text attribute, the attribute of the object being obtained by analyzing the data described in the page description language (PDL); and
    in a case where the object is drawn by the gradation drawing command, suppressing smoothing processing for the edge portion of the object whose attribute is a line, graphic, or text attribute,
    wherein the smoothing processing for the edge portion of the object whose attribute is a line, graphic, or text attribute, and which is drawn by the gradation drawing command, is suppressed by changing the attribute of the object into an image attribute.

13. A non-transitory computer-readable storage medium storing a computer-executable program for causing a computer to execute a method of controlling an image processing apparatus to perform image processing, the method comprising:
    determining whether or not a drawing command for an object is a gradation drawing command by analyzing data described in a page description language (PDL);
    in a case where the object is not drawn by the gradation drawing command, applying smoothing processing to an edge portion of the object whose attribute is a line, graphic, or text attribute, the attibute of the object being obtained by analyzing the data described in the page description languagne (PDL); and
    in a case where the object is drawn by the gradation drawing command, suppressing smoothing processing for the edge portion of the object whose attribute is a line, graphic, or text attribute, wherein the smoothing processing for the edge portion of the object whose attribute is a line, graphic, or text attribute, and which is drawn by the gradation drawing command, is suppressed by changing the attribute of the object into an image attribute.

\* \* \* \* \*